INVENTORS
ANTOINE JOSEPH VAN DEN STEEN
MARCEL VANLAER
FRANCOIS HENRY EDOUARD JOLY

United States Patent Office 3,406,007
Patented Oct. 15, 1968

3,406,007
MANUFACTURE OF MOLYBDENUM TRIOXIDE
Antoine Joseph Van Den Steen, Crolles, Marcel Vanlaer, Brignoud, and François Henry Edouard Joly, Courbevoie, France, assignors, by mesne assignments, to Ugine Kuhlman (Societe anonyme), Paris, France a corporation of France
Continuation of application Ser. No. 400,720, Oct. 1, 1964. This application Feb. 19, 1968, Ser. No. 706,710
Claims priority, application France, Oct. 7, 1963, 949,831
7 Claims. (Cl. 23—16)

ABSTRACT OF THE DISCLOSURE

This invention relates to a process for extracting molybdenum in the form of substantially pure molybdenum trioxide from material containing molybdenum in an hexavalent oxidized form which comprises the steps of contacting a solid bed of material containing molybdenum in an hexavalent oxidized form with a recycling gaseous stream consisting essentially of hydrogen chloride at a temperature between about 150° C. to 500° C., whereby the molybdenum in an hexavalent oxidized form in said material reacts with said hydrogen chloride to form gaseous molybdic chlorohydrin, continuously flowing said gaseous molybdic chlorohydrin and said gaseous stream maintained at approximately the temperature of said contacting step to a cooling zone, cooling said gaseous molybdic chlorohydrin and said gaseous stream, separating and obtaining substantially pure molybdenum trioxide, and recycling said hydrogen chloride to said contacting step.

---

This application is a continuation of our copending patent application Ser. No. 400,720, filed Oct. 1, 1964.

It is known that anhydrous hydrochloric acid reacts with molybdenum trioxide or molybdic anhydride $MoO_3$ above about 160° C. to yield an addition compound which is volatile at said temperature, and to which scientific literature has given the formula:

$$MoO_3, 2HCl \text{ or } MoO(OH)_2Cl_2, \text{ or } MoO_2Cl_2H_2O$$
$$\text{or again } H_2(MoO_3Cl_2)$$

In the following description the above compound will be referred to as "molybdic chlorohydrin."

It is also known that owing to its high volatility at relatively low temperatures molybdic chlorohydrin may easily be freed from most of the impurities which normally accompany molybdenum in various ores or industrial products.

When it is condensed and cooled at room temperature molybdic chlorohydrin takes the form of a very pale lemon yellow solid, in flakes or fine entangled needles of a very low apparent density, and is extremely hydroscopic and corrosive. It hydrolyses quickly in contact with the slightest trace of humidity, yielding a deliquescent, sticky blue mass. It is, therefore, quite a difficult substance to handle technically.

It is also known that molybdic chlorohydrin decomposes easily at not very high temperatures, yielding molybdic anhydride and hydrochloric acid.

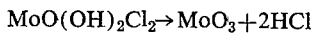
$$MoO(OH)_2Cl_2 \rightarrow MoO_3 + 2HCl$$

We have tried to make use of the above mentioned known facts to extract or recover molybdenum in pure $MoO_3$ oxide form, from widely varying molybdenum containing materials. We have found that it is possible under very special conditions to obtain substantially pure molybdenum oxide quantitatively by a continuous operation and by recycling the hydrochloric acid, starting from materials containing oxidized molybdenum in the hexavalent state.

Our work has shown that the various above mentioned known reactions may, in certain conditions, be combined into a continuous industrial cycle which yields molybdenum oxide having a high degree of purity. It has thus been shown that:

(1) All materials containing molybdenum which can be brought to a state of hexavalent oxide may be used as starting materials;

(2) Molybdic chlorohydrin is formed more quickly the greater the inflow of hydrochloric gas and the higher the temperature;

(3) Molybdic chlorohydrin is an endothermic substance that is to say, the partial equilibrium pressure of the gaseous molybdic chlorohydrin resulting from the equilibrium reaction

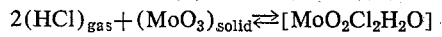
$$2(HCl)_{gas} + (MoO_3)_{solid} \rightleftarrows [MoO_2Cl_2H_2O]$$

gas is greater than the higher the temperature;

(4) The lower the temperature at which it is formed the purer will be the resulting molybdic chlorohydrin, and consequently the molybdenum oxide resulting from the decomposition thereof;

(5) Molybdic chlorohydrin can be decomposed either by heating it in air after collection, or directly in the gaseous hydrochloric atmosphere used during its preparation.

In the above mentioned conditions, the method according to the invention for the extraction of molybdenum in its pure trioxide state by decomposition of molybdic chlorohydrin comprises the steps of treating, between 150° and 500° C. and by a gaseous current formed essentially of hydrochloric acid, a material containing molybdenum brought to its oxidized hexavalent state, decomposing between 70° and 500° C. the molybdic chlorohydrin which is formed, collecting the separated molybdenum trioxide and recycling the surplus gas.

Molybdic chlorohydrin can be collected in a solid state by condensing it on a cold surface or by any other method of sudden cooling at room temperature and then heating it progressively to decompose it at a temperature between 70° and 500° C., preferably in a current of air or of another gas which is inert with respect to molybdic chlorohydrin, then recycling the remaining unreacted hydrochloric acid and collecting the molybdenum trioxide resulting from the operation:

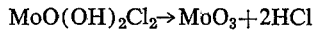
$$MoO(OH)_2Cl_2 \rightarrow MoO_3 + 2HCl$$

A particularly advantageous embodiment of the invention consists in decomposing the molybdic chlorohydrin in the same atmosphere of hydrochloric gas in which it has been formed in such conditions that the speed of decomposition of said molybdic chlorohydrin into molybdenum trioxide and gaseous hydrochloric acid is greater than the recombining speed of said trioxide with hydrochloric acid. In a first modification the gaseous current resulting from the reaction is brought into contact with a solid body having a temperature lower than that of the gaseous current but higher than the condensation temperature of molybdic chlorohydrin, in such a way that the chlorohydrin decomposes on the said body, depositing molybdenum trioxide onto it in a dense crystalline form and in a quantity which is greater the nearer the partial pressure of the gaseous chlorohydrin from the reaction is to the partial equilibrium pressure at the final reaction temperature and also the greater the available surface and the wider the gap between the temperature of the solid and the final reaction temperature.

According to another modification the condensed chlorohydrin in a solid state is heated to a temperature of over 70° C. in an atmosphere of hydrochloric gas which is either static or slowly moving with respect to said solid molybdic chlorohydrin. In the atmosphere of hydrochloric gas saturated with chlorohydrin this causes part of the latter to decompose into molybdenum trioxide and another part, which is greater the higher the heating temperature, to be sublimated. It is then possible to condense the sublimated part again and to submit it to a further decomposition process in the same atmosphere, and to repeat this operation as often as is required.

In all cases the reactions of forming and decomposing molybdic chlorohydrin should preferably be carried out at a temperature as low was possible while still being compatible with an economic speed of reaction, and with the lowest possible flow of hydrochloric gas, which may otherwise be recycled.

It can therefore be seen that the invention offers the essential advantage of forming molybdenum oxide by dissociation of molybdic chlorohydrin immediately after the reaction which gives rise to the said chlorohydrin, and in the gaseous reaction medium itself, with or without an intermediary condensation of the chlorohydrin; the apparatus used can thus be considerably simplified and the gaseous hydrogen chloride used in the extraction of molybdenum can be recycled directly and in its entirety whilst the extracted molybdenum is obtained in its trioxide form.

According to the invention it is also possible to obtain molybdenum trioxide in as pure a state as desired, it being only necessary to include a certain number (theoretically unlimited) of total condensation cycles followed by fractional sublimation between the operation in which molybdic chlorohydrin is formed and that in which it is decomposed.

In all cases the molybdenum in the starting molybdenum-containing material should be in the hexavalent oxidized form; it may either be initially in the said form or be brought to the said form by a preliminary oxidizing roasting or by adding a suitable quantity of oxygen or air to the hydrochloric gas used for the initial reaction producing molybdic chlorohydrin.

According to the invention it is therefore possible to extract or recover the molybdenum contained in any concentration in any raw materials in a solid state.

The said raw materials may, for example, consist of:

Molybdenum ore in which molybdenum exists naturally in an oxidized form, such as lead molybdate or wulfenite, or which may be easily oxidized by roasting such as molybdenite ($MoS_2$);

Industrial products such as technical molybdenum oxide which results from roasting molybdenite ($MoS_2$), or molybdenum salts, particularly sodium molybdate, calcium molybdate and the like;

Molybdenum sesquioxide or dioxide or even metallic molybdenum or alloys of molybdenum and other metals which are easily oxidable in the hexavalent form.

By-products or residues of ore processing or of industrial manufacture such as those resulting from roasting residual molybdenite from tungsten ore plants; residue from the production of sublimated molybdenum oxide rich in $MoO_3$; filtration residue from molybdenum salts plants; used catalysts containing molydenum; metallic scrap from pure molybdenum metallurgy or alloys from the manufacture of molybdenum with other metals.

The materials used are preferably in a divided form in order to improve the contact between the solid and the hydrochloric gas, this also making it easier to feed fresh solid material into the reactor and also to evacuate exhausted material from the reactor by any known means, either continuous or discontinuous. The substance to be treated may be fluidized or surrounded by an auxiliary fluidized bed formed from any inert substance (sand for example), fluidization being ensured by hydrochloric gas either by itself or with another gas.

The process according to the invention may be carried out by means of any type of device giving the best conditions for heating and circulating of the solids and gases and for their mutual contact. The said device may be a reactor consisting of a simple column containing a stationary or mobile bed of the product to be treated with hydrochloric gas (with an addition of oxygen or air if necessary) passing through the said bed. The reactor may be a turning mill similar to a roasting mill for pyrites, in which stirrer arms ensure a methodic circulation of the solids being with respect to the gas, a rotary inclined kiln, or a stationary, horizontal or inclined cylindrical kiln, in which the product is pushed forward by blades or by an Archimedian screw, a kiln in which the product is moved forward by vibrations, or the like.

The reactor can be made of any materials resistant to gaseous hydrochloric acid and oxidation at the above stated temperatures; for example, nickel and nickel alloys, special steels, or various ceramic materials (bricks or quartz for example), ordinary enamelled steel may be used, or glasses which have a high softening point such as Vycor and Pyrex (trademarks).

Various embodiments of the invention are described hereinafter, reference being made to the attached diagrammatic drawings, in which.

Figure 1:
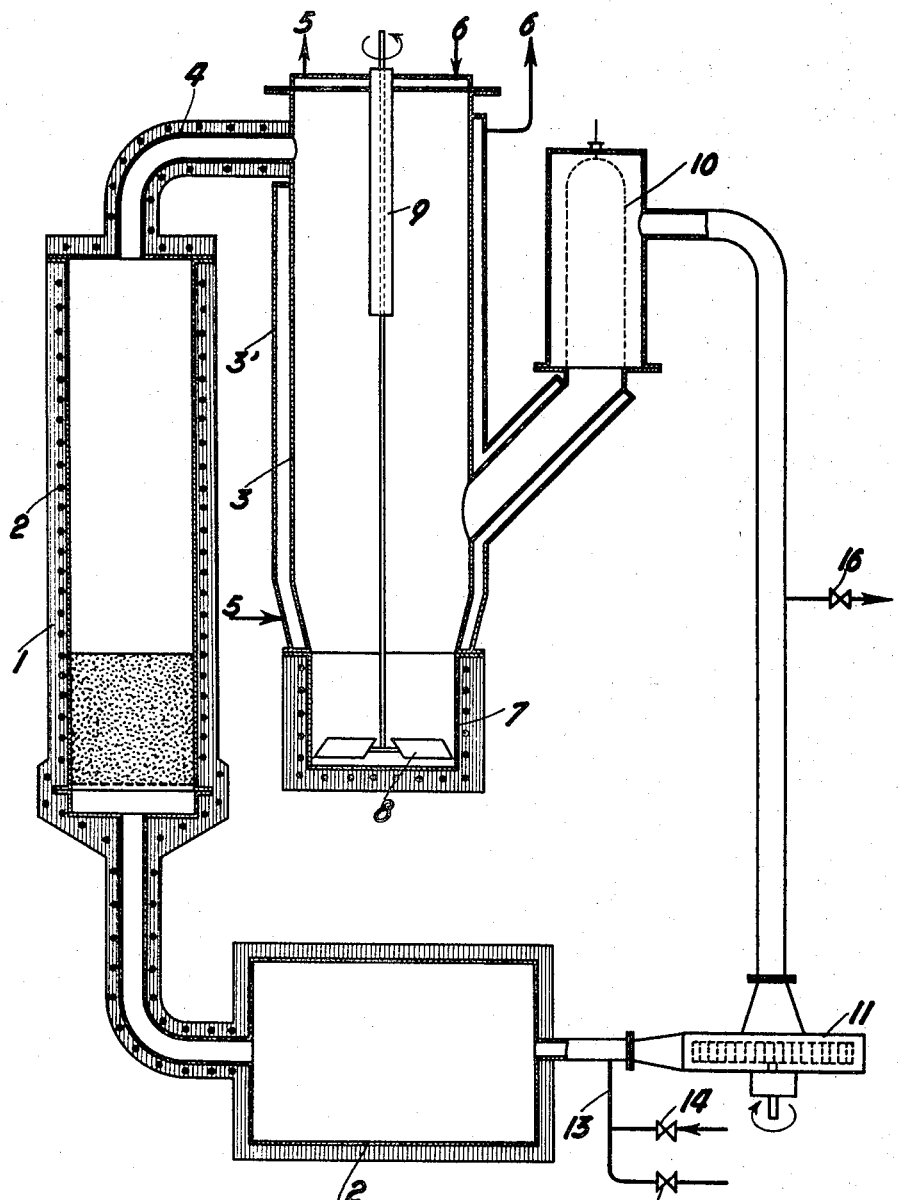
FIG. 1 shows an apparatus for producing molybdenum trioxide, with intermediate condensation of molybdic chlorohydrin.

In the example of FIGURE 1, the reactor consists of a vertical nickel tube 1 heated by an electrical device 2 and connected to a condenser 3 by means of a nickel pipe 4 which is heated to exactly the same temperature as the reactor. The condenser 3, which is made, for example, of special steel sheet or of any other corrosion resistant material, is intensively cooled by a double jacket 3', in which cold water circulates (inlets and outlets at 5 and 6, respectively).

Condenser 3 extends at its lower part in a nickel container, or decomposer, 7 provided with a stirrer 8, the shaft of which passes through a cooled sheath 9. Container 7 is heated electrically up to the lower end of double cooling jacket 3' of condenser 3.

At the outlet of condenser 3 the gas passes through a filtering device 10 of any known type which may be also cooled; said filter 10 may, for example, comprise a synthetic textile sleeve resistant to cold hydrochloric acid.

The cold gases are then taken up by a sealed high pressure fan 11 and returned to reactor 1 through a pre-heating furnace 12.

A lateral tube 13 and valves 14, 15, as well as a purging valve 16 allow the apparatus to be placed at will in an atmosphere of hydrochloric acid or to purge it by means of air or nitrogen. The quantity of gas fed through valves 14 or 15, as well as the recycling flow passing through fan 11 may be measured and controlled very simply by any known means, the gas being cold between the condenser and the pre-heater. The corresponding devices have not been shown in the diagram.

500 grams of a residue from the manufacture of sublimated molybdenum oxide, crushed and sieved at 12–35 mesh were placed in the reactor. The analysis of said residue was as follows:

| | Percent |
|---|---|
| Mo (as $MoO_3$) | 48.98 |
| $SiO_2$ | 22.40 |
| $Fe_2O_3$ | 1.39 |
| $Al_2O_3$ | 2.29 |

The layer was about 4 cm. deep. The system having been purged with pure gaseous hydrochloric acid the reactor 1, the preheater 12 and the connecting pipework were heated to a temperature of 350° C.

The decomposer 7 was heated to 400° C. and the stirrer 8 put in motion. A flow of HCl of 600 liters per hour was started while at the same time pressure in the system was balanced by feeding hydrochloric acid under a constant pressure through valve 15. The molybdic chlorohydrin formed in reactor 1 condensed in condenser 3 in the form of large flakes which fell back into decomposer 7. Part of said flakes was decomposed into molybdenum trioxide, another part was sublimated but was condensed in the lower part of condenser 3 and again fell back into decomposer 7 where it was again decomposed. The fine flakes drawn out of condenser 3 were stopped by filter sleeve 10 which was occasionally shaken to cause the molybdic chlorohydrin remaining therein to fall back into decomposer 7.

The operation lasted for two hours fifty minutes after which the entire apparatus was purged by nitrogen and cooled, and the contents of reactor 1 and decomposer 7 were collected and analysed.

The reactor contained 132 grams of residue with a molybdenum content no higher than 0.40%.

The extraction level of molybdenum was as follows:

Mo at start
$$\frac{48.98 \times 500}{100} = 241.90 \text{ gr.}$$

Mo remaining in the residue
$$\frac{0.4 \times 132}{100} = 0.528 \text{ gr.}$$

The extraction rate was therefore 99.78% comprising 361 gr. of molybdenum oxide/99.40% $MoO_3$ were collected from the decomposer with the following analysis:

| | Percent |
|---|---|
| Cl | 0.15 |
| Fe | 0.17 |
| Ni | 0.01 |
| Cr | 0.02 |
| Si | 0.03 |
| Ca+K+Na | below 0.003 |

98% of the quantity of molybdenum extracted from the residue treated was therefor recovered in the trioxide form.

A small quantity of molybdenum remained in the apparatus in the form of chlorohydrin flakes adhering to the walls of condenser 3 and of filtering sleeve 10.

The consumption of hydrochloric gas passing through valve 14 during the operation amounted to 8 liters as measured at normal temperature and pressure, mostly due to the fixation of chlorine by the impurities contained in the residue treated, which had a chlorine content of 6.20% after the molybdenum had been extracted.

Figure 2:
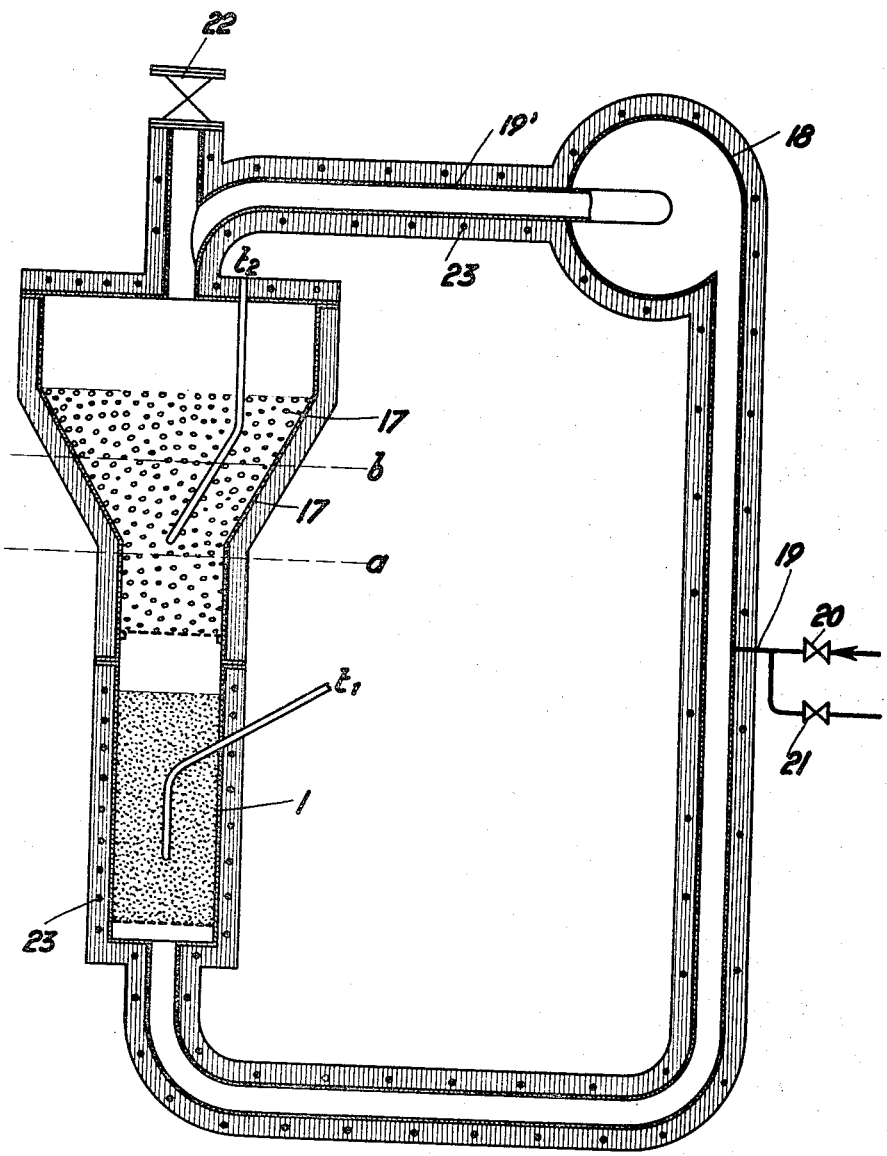
FIG. 2 shows an apparatus for producing molybdenum trioxide by decomposing molybdic chlorohydrin directly from the vapour stage on a heated support.

In the example shown in FIGURE 2 the reactor 1 consists of a nickel tube 100 mm. in diameter and 500 mm. in height; the upper end of said tube extends in a decomposer 17, also made of nickel, which has an enlarged upper part (250 mm. diameter).

A sealed, variable speed, high pressure ventilator 18 provides for recycling, with a flow capacity known by preliminary calibration, of gases which are fed through a lateral pipe 19 and valves 20 (HCl) and 21 (air or nitrogen). A valve 22 is provided for purging the system.

In reactor 1 were placed 2800 grams of a residue from the manufacture of sublimated molybdenum oxide having the following composition:

| | Percent |
|---|---|
| Mo (as $MoO_3$) | 48.98 |
| $SiO_2$ | 22.40 |
| $Fe_2O_3$ | 1.39 |
| $Al_2O_3$ | 2.29 | the particle size being between 0.5 and 1.6 mm. The height of the bed was about 22 cm.

A bed of alumina balls 17' of 15 to 20 mm. diameter was placed in decomposer 17 to a total depth of about 40 cm.

The apparatus was purged with gaseous hydrochloric acid. Reactor 1 and the part of pipe 19' forming the preheater situated between reactor 1 and fan 18 were heated to 450° C. by an electric resistance 23.

The walls of the decomposer 17 were held at 140° C. by regulated electrical heating, so that the bottom of the bed of balls should be at 450° C. and that a temperature gradient occurred in the bed of balls 17'.

The rest of the circuit—including the upper part of the decomposer and the fan—was held at 300° C.

The fan was started whilst pressure in the system was balanced by feeding hydrochloric gas at a constant pressure through valve 20.

The gas inflow was regulated at 380 liters per hour of hydrochloric gas, as measured at normal temperature and pressure. The consumption of HCl fed through tube 19 only totalled about ten liters as measured in the same conditions. At the beginning of the operation the temperature measured by temperature probe $t_2$ of the bed of balls rose and then became stable at about 200° C. The operation lasted two hours and five minutes in all, whereafter the apparatus was purged with nitrogen until it was completely cold.

The contents of the reactor and the bed of balls were collected. On examination, the balls were found to be coated with molybdenum trioxide in the central zone $ab$ of the bed. There was no deposit below level $a$ or above level $b$.

The oxide deposited on the balls was collected by passing said balls in the drum of a ball crusher and 1100 gr. of molybdenum oxide was collected having the following analysis:

| | Percent |
|---|---|
| Mo | 66.70 |
| Fe | 0.11 |
| Cr | 0.13 |
| Ni | 0.09 |
| Si | 0.013 |
| Al | below 0.01 |
| Ca+K+Na | below 0.005 |
| Cl | 0.17 |

1,666 gr. of residue containing 36.92% Mo was collected from the reactor, the balance of molybdenum being as follows:

Mo at start $\quad \dfrac{2.800 \times 48.98}{100} = 1{,}371.4 \text{ gr.}$

Mo remaining after extraction $\dfrac{1.666 \times 36.92}{100} = 615.2 \text{ gr.}$ Mo recovered from the reactor $\quad$ 756.2 gr.

Mo recovered $\quad \dfrac{1.100 \times 66.70}{100} = 733.7 \text{ gr.}$

97% of the molybdenum extracted from the sublimation residue was recovered in the form of molybdenum trioxide of more than 99% purity; the difference, that is 22.5 gr. of Mo, probably corresponds to chlorohydrin condensed in various parts of the apparatus during cooling.

It was also found that in this run, where no effort was made to extract molybdenum to the limit, the molybdenum contents at the lower part of the reactor was only 0.5% Mo, that is to say, the lowest layer was practically exhausted.

It is clear that the apparatus according to FIGURE 2 and the process described above are easily applicable in industry; in particular it is possible to ensure continuous feeding of materials to be treated into the reactor, while material in which no molybdenum remains can also be drawn off continuously. A moble bed may also be formed in the decomposer, which allows the molybdenum oxide deposited on the balls to be drawn off continuously, by passing them in a rotating drum, for example.

The molybdic chlorohydrin can also be decomposed on a mobile or fluidized bed of particles of molybdenum trioxide which is drawn off continuously or at regular intervals.

In the two examples described above, the molybdenum trioxide thus obtained can be considered as being pure as its $MoO_3$ contents is greater than 99%, and it is practically free from alkaline and alkaline-earth metals. However, it also contains an appreciable quantity of iron, nickel, chromium and silicon, and impurities originating either from the residue treated or through corrosion of the apparatus used.

Figure 3:
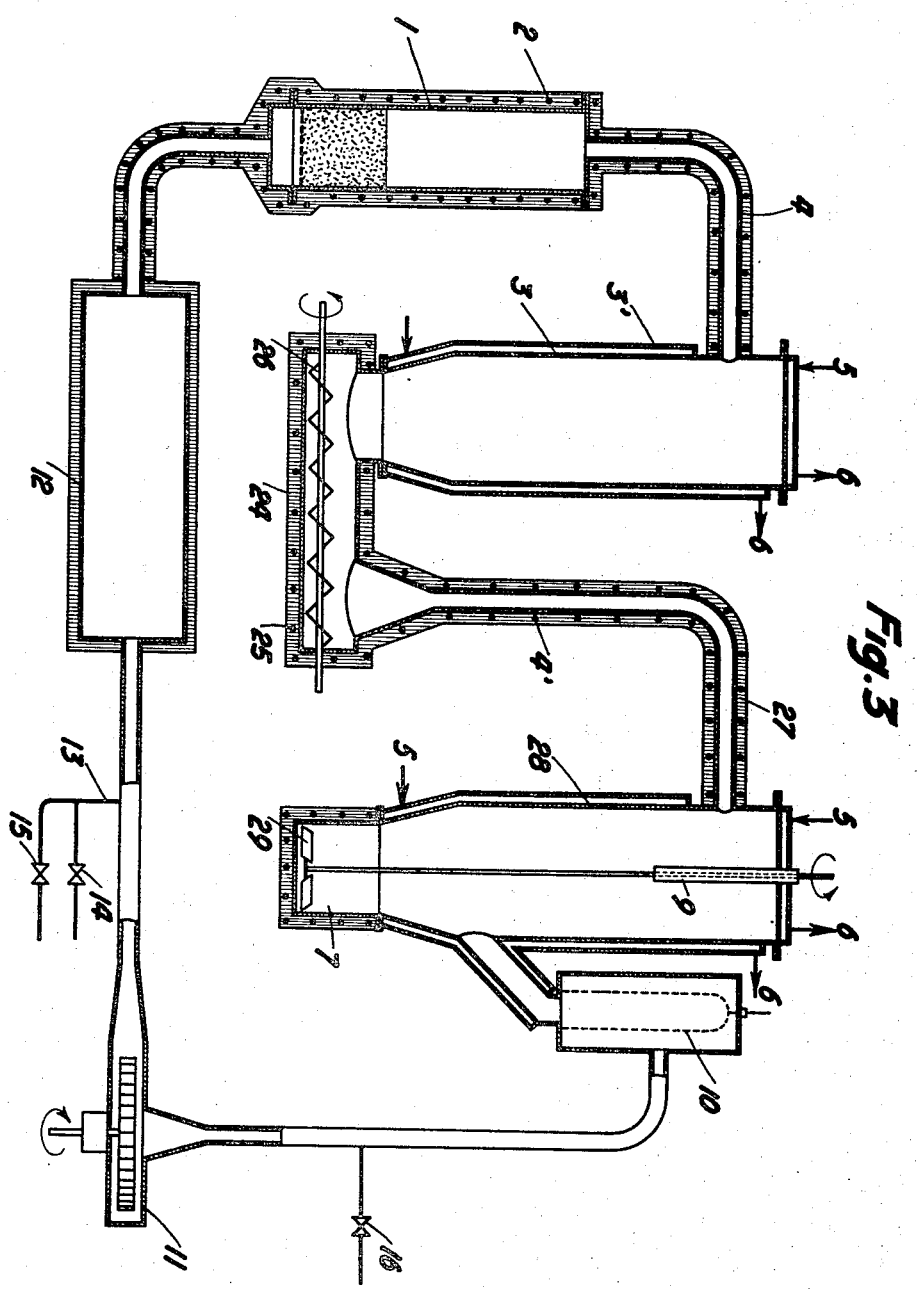
FIG. 3 shows a modification which enables molybdenum oxide to be purified by condensation and subsequent distillation of the molybdic chlorohydrin.

FIGURE 3 illustrates an apparatus which enables a process to be carried out which eliminates these last impurities. The apparatus is identical to that shown in FIGURE 1 but between the condenser 3 (which has no stirrer) and the filtering system it comprises a trough 24, heated by an electrical or other heating device 25 and provided with a screw-conveyor 26; trough 24 is connected by a heated tube 27 to a second condenser 28 provided with a stirrer 29 and connected to the filtering system 10.

In reactor 1 were placed 930 gr. of technical molybdenum oxide originating from the roasting of molybdenite concentrates, with the following analysis:

| | Percent |
|---|---|
| $MoO_3$ | 83.37 |
| $MoO_2$ | 5.26 |
| $SiO_2$ | 7.00 |
| $Fe_2O_3$ | 1.77 |
| $Al_2O_3$ | 3.27 |

Particle size 0.2 to 3 mm.
Depth of bed about 90 mm.

The whole of the apparatus was purged, through the valve 16, of gaseous HCl fed in through valve 14. When operational temperatures were reached a supply of hydrochloric gas at 500 liters per hour was started, as measured at normal temperature and pressure.

The gas preheated to 400° C. in preheater 12 passed through reactor 1, also heated to 400° C. and then passed through pipe 4 also heated to 400° C. into the first condenser 3 which was water-cooled externally. The solidified molybdic chlorohydrin fell into trough 24. A current of chlorohydric acid passed through said trough 24, heated to 380° C. A small quantity of the chorohydrin was decomposed in said trough but the greater part was again sublimated and was drawn by the gas through tube 27, heated by electrical resistance 4' to 400° C., into the second condenser 28, made of steel with an inner protective layer of plastic, from which it fell as a solid into decomposer 7, made of enamelled steel, where it was decomposed at a temperature of 400° C. into molybdenum trioxide.

The excess hydrochloric gas, and that originating from decomposition, were recycled by the sealed fan 11 and were drawn back to reactor 1 through preheater 12.

After three hours the apparatus was purged with dry air and the products from reactor 1, trough 24 and decomposer 7 were collected and examined.

The reactor contained 140 g. of residue with a molybdenum contents of 3.20%. The extraction rate of molybdenum was 99.20%.

69 gr. of molybdenum oxide at 97.50% $MoO_3$ were extracted from trough 24, containing:

| | Percent |
|---|---|
| Fe | 1.03 |
| Cr | 0.43 |
| Ni | 0.04 |
| Si | 0.05 |
| Cl | 0.18 |

702 gr. of molybdenum trioxide were taken from decomposer 7, having the following analysis:

| | Percent |
|---|---|
| Cl | 0.15 |
| Fe | 0.010 |
| Si | 0.010 |
| Mg | 0.0010 |
| Al | 0.0010 |
| Cr | below 0.0003 |
| Ni | below 0.0001 |
| Sn | 0.0004 |
| Sb | below 0.0002 |
| Ca | below 0.0010 |
| Na+K | below 0.0010 |

Molybdenum extracted from the roasted molybdenite was therefore recovered at the rate of:

8.4% in the form of oxide at 97.5% $MoO_3$ in trough 24
87.3% in the form of oxide at 99.82% $MoO_3$ in decomposer 7 and the total recovery rate was 95.7%.

The relative proportions of oxide collected in trough 24 and decomposer 7 can be varied at will. By merely altering the temperature of the first decomposer (trough 24) or placing said trough in such a way that only part of the gaseous current passes through it, or again, so that the gaseous current only passes through part of the length thereof, all these measures influencing the sublimation speed of molybdic chlorohydrin.

An oxide of the type obtained in decomposer 7 is so pure in metallic elements that it is a first class raw material for the manufacture of pure derivatives of molybdenum, and for manufacturing metallic molybdenum by hydrogen reduction. The chlorine contents thereof is totally eliminated as soon as the dioxide $MoO_2$ stage is reached. It should be pointed out that 10 gr. of the oxide collected from decomposer 7 and contained in a cup of pure aluminum in a laboratory kiln heated progressively to 1050° C. under a current of pure, dry hydrogen for one hour and held at this temperature for one hour yielded a molydenum powder in which the most sensitive means of analysis could detect no trace of chlorine.

We claim:

1. A continuous process for extracting molybdenum in the form of substantially pure molybdenum trioxide from material containing molybdenum in a hexavalent oxidized form which comprises the steps of contacting a solid bed of material containing molybdenum in an hexavalent oxidized form with a recycling gaseous stream consisting essentially of hydrogen chloride at a temperature between about 150° C. and 500° C., whereby the molybdenum in a hexavalent oxidized form in said material reacts with said hydrogen chloride to form gaseous molybdic chlorohydrin, continuously flowing said gaseous molybdic chlorohydrin and said gaseous stream maintained at approximately the temperature of said contacting step to a cooling zone, cooling said gaseous molybdic chlorohydrin and said gaseous stream below the condensation temperature of molybdic chlorohydrin, separating solid molybdic chlorohydrin from said gaseous stream, heating said separated solid molybdic chlorohydrin in the presence of said cooled gaseous stream to a temperature between about 150° C. and 500° C., whereby said molybdic chlorohydrin decomposes into substantially pure solid molybdenum trioxide and gaseous hydrogen chloride, recovering said substantially pure solid molybdenum trioxide, heating said cooled gaseous stream containing said gaseous hydrogen chloride to a temperature of between about 150° C. and 500° C. and recycling said heated gaseous stream consisting essentially of hydrogen chloride to said contacting step.

2. A continuous process for extracting molybdenum in the form of substantially pure molybdenum trioxide from material containing molybdenum in a hexavalent oxidized form which comprises the steps of contacting a solid bed of material containing molybdenum in an hexavalent oxidized form with a recycling gaseous stream consisting essentially of hydrogen chloride at a temperature between about 150° C. and 500° C. whereby the molybdenum in an hexavalent oxidized form in said material reacts with said hydrogen chloride to form gaseous molybdic chlorohydrin, continuously flowing said gaseous molybdic chlorohydrin and said gaseous stream at approximately the temperature of said contacting step to a cooling zone containing a particulate solid body, maintaining said particulate solid body at a temperature lower than the temperature of said gaseous molybdic chlorohydrin and said gaseous stream and higher than the condensation temperature of said gaseous molybdic chlorohydrin, whereby said gaseous molybdic chlorohydrin in said gaseous stream decomposes into substantially pure solid molybdenum trioxide, which is deposited on said particulate solid body, and gaseous hydrogen chloride, recovering said substantially pure solid molybdenum trioxide, heating said cooled gaseous stream containing gaseous hyrogen chloride to a temperature between about 150° C. and 500° C. and recycling said heated gaseous stream consisting essentially of hydrogen chloride to said contacting step.

3. The process of claim 2 wherein said particulate solid body is a bed of molybdenum trioxide particles.

4. The process of claim 2 wherein said particulate solid body is stationary.

5. The process of claim 2 wherein said particulate solid body is fluidized.

6. The process of claim 2 wherein said particulate solid body is maintained at a temperature of between over 70° C. and below the temperature of said gaseous molybdic chlorohydrin and said gaseous stream.

7. A continuous process for extracting molybdenum in the form of substantially pure molybdenum trioxide from material containing molybdenum in an hexavalent oxidized form which comprises the steps of contacting a solid bed of material containing molybdenum in an hexavalent oxidized form with a recycling gaseous stream consisting essentially of hydrogen chloride at a temperature between about 150° C. and 500° C., whereby the molybdenum in an hexavalent oxidized form in said material reacts with said hydrogen chloride to form gaseous molybdic chlorohydrin, continuously flowing said gaseous molybdic chlorohydrin and said gaseous stream maintained at approximately the temperature of said contacting step to a cooling zone, cooling said gaseout molybdic chlorohydrin and said gaseous stream below the condensation temperature of molybdic chlorohydrin, separating solid molybdic chlorohydrin from said gaseous stream, heating said separated solid molybdic chlorohydrin and said gaseous stream to a temperature between about 150° C. and 500° C., contacting said heated gaseous stream and said heated solid molybdic chlorohydrin to form gaseous molybdic chlorohydrin substantially free of impurities, continuously flowing said purified gaseous molybdic chlorohydrin and said gaseous stream maintained at approximately the temperature of said second contacting step to a cooling zone, cooling said gaseous molybdic chlorohydrin and said gaseous stream below the condensation temperature of molybdic chlorohydrin, separating solid molybdic chlorohydrin from said gaseous stream, heating said separated solid molybdic chlorohydrin in the presence of said cooled gaseous stream to a temperature between about 150° C. and 500 C., whereby said molybdic chlorohydrin decomposes into substantially pure solid molybdenum trioxide and gaseous hydrogen chloride, recovering said substantially pure solid molybdenum trioxide, heating said cooled gaseous stream containing said gaseous hydrogen chloride to a temperature of between about 150° C. and 500° C. and recycling said heated gaseous stream consisting essentially of hydrogen chloride to said first contacting step.

References Cited

UNITED STATES PATENTS

| | | | |
|---|---|---|---|
| 1,239,885 | 9/1917 | Cleaves | 23—17 X |
| 1,329,380 | 2/1920 | Doerner | 23—17 |
| 3,254,945 | 6/1966 | McGrath et al. | 23—17 |

OSCAR R. VERTIZ, *Primary Examiner.*

H. T. CARTER, *Assistant Examiner.*